US008504622B1

(12) United States Patent
Mariswamy et al.

(10) Patent No.: US 8,504,622 B1
(45) Date of Patent: Aug. 6, 2013

(54) SYSTEM, METHOD, AND COMPUTER PROGRAM PRODUCT FOR REACTING BASED ON A FREQUENCY IN WHICH A COMPROMISED SOURCE COMMUNICATES UNSOLICITED ELECTRONIC MESSAGES (75) Inventors: Hariprasad Mariswamy, Bangalore (IN); Christopher Barton, Buckingham (GB); Nick P. Kelly, Milton Keynes (GB); Guy William Welch Roberts, Milton Keynes (GB); John Sargent, Buckingham (GB); Karthik Umashankar, Bangalore (IN); Paul D. Walker, Bicester (GB)

(73) Assignee: McAfee, Inc., Santa Clara, CA (US)

( * ) Notice: Subject to any disclaimer, the term of this patent is extended or adjusted under 35 U.S.C. 154(b) by 554 days.

(21) Appl. No.: 11/935,185

(22) Filed: Nov. 5, 2007

(51) Int. Cl.
*G06F 15/16* (2006.01)
(52) U.S. Cl.
USPC .......................................... 709/206; 709/223
(58) Field of Classification Search
USPC .......................................................... 709/206
See application file for complete search history.

(56) References Cited

U.S. PATENT DOCUMENTS

| 5,649,100 | A | * | 7/1997 | Ertel et al. ..................... 709/225 |
| 5,987,610 | A | | 11/1999 | Franczek et al. |
| 6,073,142 | A | | 6/2000 | Geiger et al. |
| 6,381,267 | B1 | * | 4/2002 | Abdelilah et al. ............ 375/222 |
| 6,460,050 | B1 | | 10/2002 | Pace et al. |
| 7,254,136 | B1 | * | 8/2007 | Gunter et al. ................. 370/401 |
| 7,275,082 | B2 | * | 9/2007 | Pang ............................. 709/206 |
| 7,305,709 | B1 | * | 12/2007 | Lymer et al. .................... 726/25 |
| 7,310,818 | B1 | * | 12/2007 | Parish et al. .................... 726/24 |
| 7,355,509 | B2 | * | 4/2008 | Rennie et al. ............. 340/426.16 |
| 7,437,457 | B1 | * | 10/2008 | Eisendrath et al. ........... 709/225 |
| 7,496,960 | B1 | * | 2/2009 | Chen et al. ...................... 726/22 |
| 7,506,155 | B1 | | 3/2009 | Stewart et al. |
| 2003/0023745 | A1 | * | 1/2003 | Noe .............................. 709/235 |
| 2003/0112802 | A1 | * | 6/2003 | Ono et al. ...................... 370/389 |
| 2003/0128231 | A1 | * | 7/2003 | Kasriel et al. ................. 345/736 |
| 2003/0188160 | A1 | * | 10/2003 | Sunder et al. ................. 713/165 |
| 2004/0073634 | A1 | * | 4/2004 | Haghpassand ................ 709/220 |
| 2004/0117488 | A1 | * | 6/2004 | McNamee ..................... 709/229 |
| 2004/0138835 | A1 | * | 7/2004 | Ransom et al. .................. 702/62 |
| 2005/0021649 | A1 | * | 1/2005 | Goodman et al. ............ 709/207 |
| 2005/0138032 | A1 | * | 6/2005 | O'Rourke et al. .............. 707/10 |
| 2005/0195748 | A1 | * | 9/2005 | Sanchez ........................ 370/252 |
| 2005/0198261 | A1 | * | 9/2005 | Durvasula et al. ............ 709/224 |
| 2005/0210534 | A1 | * | 9/2005 | Krishnamurthy ............... 726/23 |
| 2006/0026242 | A1 | * | 2/2006 | Kuhlmann et al. ........... 709/206 |
| 2006/0031464 | A1 | * | 2/2006 | Bowman et al. .............. 709/224 |
| 2006/0036690 | A1 | * | 2/2006 | O'Neil .......................... 709/206 |
| 2006/0075048 | A1 | * | 4/2006 | Gruper et al. ................. 709/206 |
| 2006/0077964 | A1 | * | 4/2006 | Wu et al. ....................... 370/352 |

(Continued)

OTHER PUBLICATIONS

IP2Location (Freedownload Center, Dec. 6, 2006).*

(Continued)

*Primary Examiner* — Moise Emmanuel
*Assistant Examiner* — Waseem Ashraf
(74) *Attorney, Agent, or Firm* — Patent Capital Group (57) ABSTRACT

A system, method, and computer program product are provided for reacting based on a frequency in which a compromised source communicates unsolicited electronic messages. In use, a source of at least two unsolicited electronic messages is identified as compromised. Additionally, a frequency in which the source communicated the unsolicited electronic messages is calculated. Furthermore, a reaction is performed based on the calculated frequency.

21 Claims, 7 Drawing Sheets

U.S. PATENT DOCUMENTS

| | | | |
|---|---|---|---|
| 2006/0146923 A1* | 7/2006 | Mardinian | 375/222 |
| 2006/0267802 A1* | 11/2006 | Judge et al. | 340/995.1 |
| 2006/0288076 A1* | 12/2006 | Cowings et al. | 709/206 |
| 2007/0038703 A1* | 2/2007 | Tendjoukian et al. | 709/206 |
| 2007/0086334 A1* | 4/2007 | Wakumoto et al. | 370/229 |
| 2007/0150951 A1* | 6/2007 | Aaron et al. | 726/22 |
| 2007/0185963 A1* | 8/2007 | Stauffer | 709/207 |
| 2007/0192855 A1* | 8/2007 | Hulten et al. | 726/22 |
| 2007/0198350 A1* | 8/2007 | O'Kelley et al. | 705/14 |
| 2007/0233861 A1* | 10/2007 | Cai et al. | 709/225 |
| 2007/0248027 A1* | 10/2007 | Roberts et al. | 370/254 |
| 2007/0250468 A1* | 10/2007 | Pieper | 707/1 |
| 2008/0072264 A1* | 3/2008 | Crayford | 725/86 |
| 2008/0120413 A1* | 5/2008 | Mody et al. | 709/226 |
| 2008/0320095 A1* | 12/2008 | Pearson et al. | 709/207 |
| 2009/0198746 A1* | 8/2009 | Hintze et al. | 707/202 |
| 2010/0031340 A1* | 2/2010 | Batke et al. | 726/13 |

OTHER PUBLICATIONS

IP2Location (freedownloadcenter, Dec. 6, 2006).*
IP2Location (freedownloads, Dec. 6, 2006).*
IP2Location (IP2location, freedownloads, Dec. 6, 2006).*
"Barracuda Spam Firewall Outbound Rate Control System Stops Spam before It Is Sent," Barracuda Networks, Press Releases, May 23, 2005.

* cited by examiner

SYSTEM, METHOD, AND COMPUTER PROGRAM PRODUCT FOR REACTING BASED ON A FREQUENCY IN WHICH A COMPROMISED SOURCE COMMUNICATES UNSOLICITED ELECTRONIC MESSAGES

FIELD OF THE INVENTION

The present invention relates to unsolicited electronic messages, and more particularly to reacting to unsolicited electronic messages.

BACKGROUND

Unsolicited electronic messages have traditionally posed annoyances and/or threats to recipients of such messages. For example, unsolicited messages oftentimes contain unwanted advertising, viruses, information attempting to fraudulently acquire sensitive personal information, etc. Many times, the source of the unsolicited messages may not be aware that it is sending such unsolicited messages. For example, software installed on a compromised computer without the knowledge of an owner of the computer may send out unsolicited messages without the permission of the owner.

Conventional systems (e.g. security systems, etc.) utilized for identifying unsolicited electronic messages have exhibited various limitations with respect to reacting to unsolicited electronic messages received by compromised sources. For example, such systems are generally unable to effectively gauge the severity of threat that a compromised source of unsolicited electronic messages poses, and further to notify a host of the compromised source of that severity. There is thus a need for addressing these and/or other issues associated with the prior art.

SUMMARY

A system, method, and computer program product are provided for reacting based on a frequency in which a compromised source communicates unsolicited electronic messages. In use, a source of at least two unsolicited electronic messages is identified as compromised. Additionally, a frequency in which the source communicated the unsolicited electronic messages is calculated. Furthermore, a reaction is performed based on the calculated frequency.

DETAILED DESCRIPTION

Figure 1:
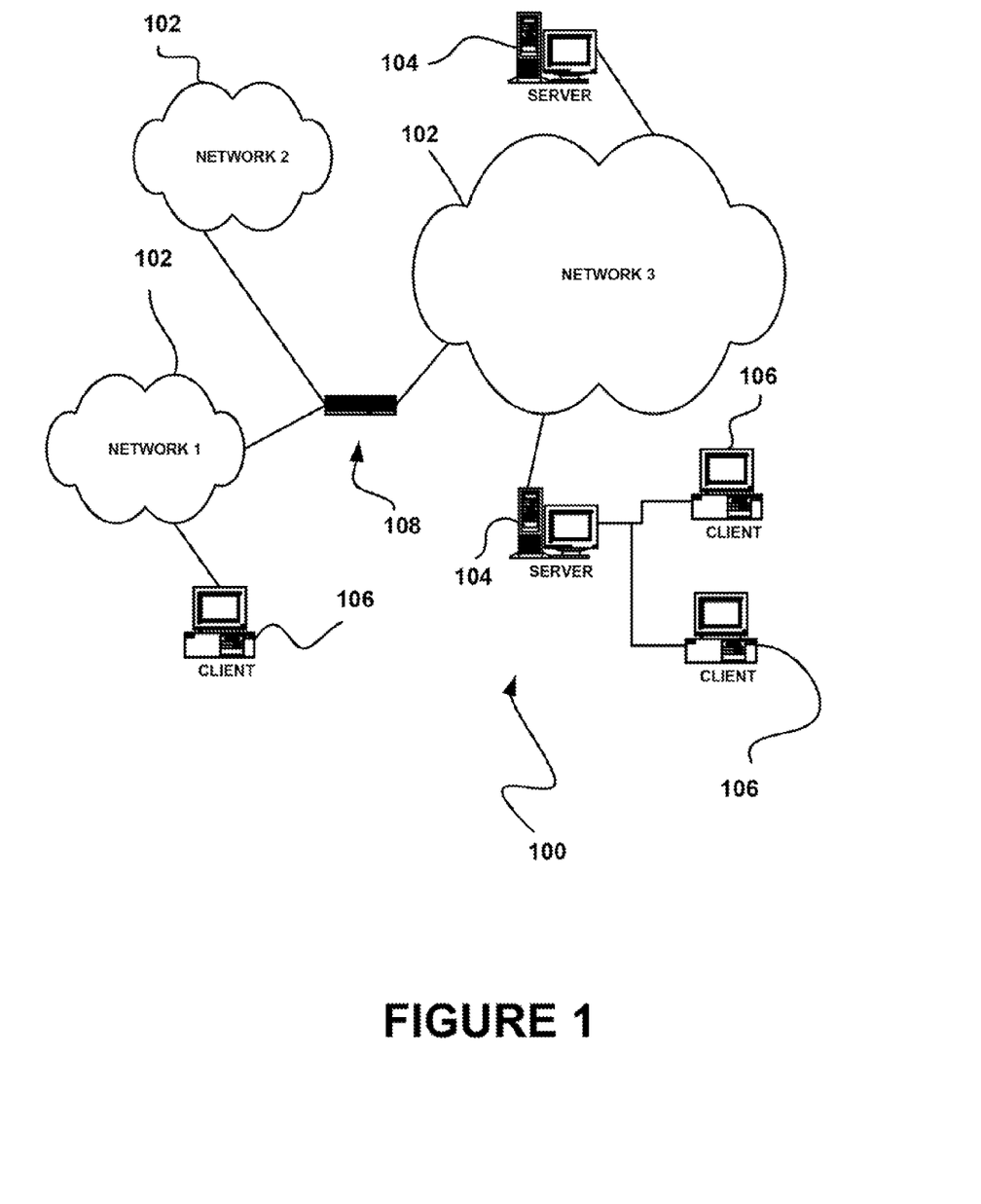
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and or any other type of logic. In order to facilitate communication among the networks 102, at least one gateway 108 is optionally coupled therebetween.

Figure 2:
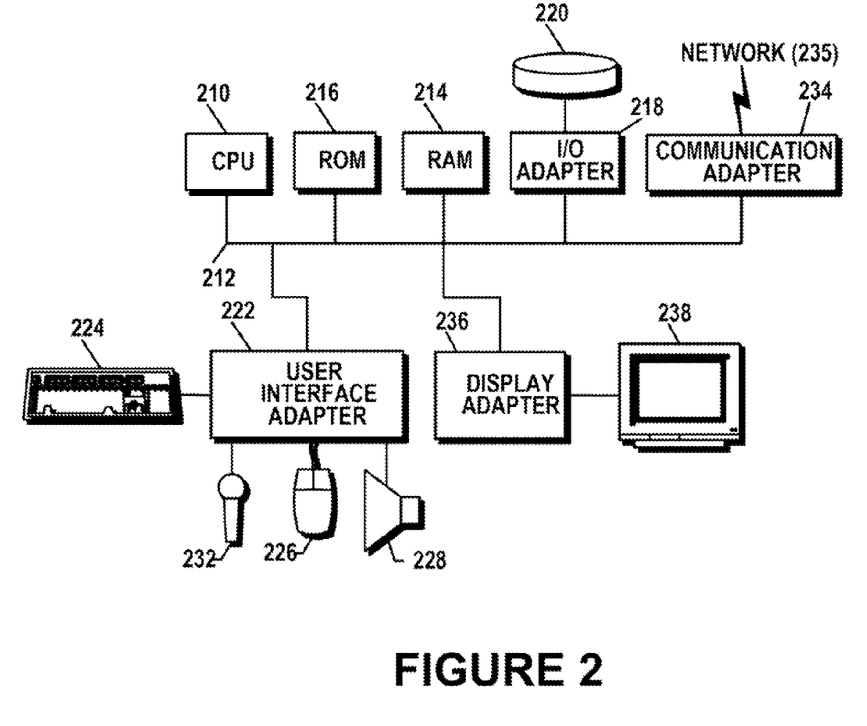
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read. Only Memory (ROM) 216, an 110 adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
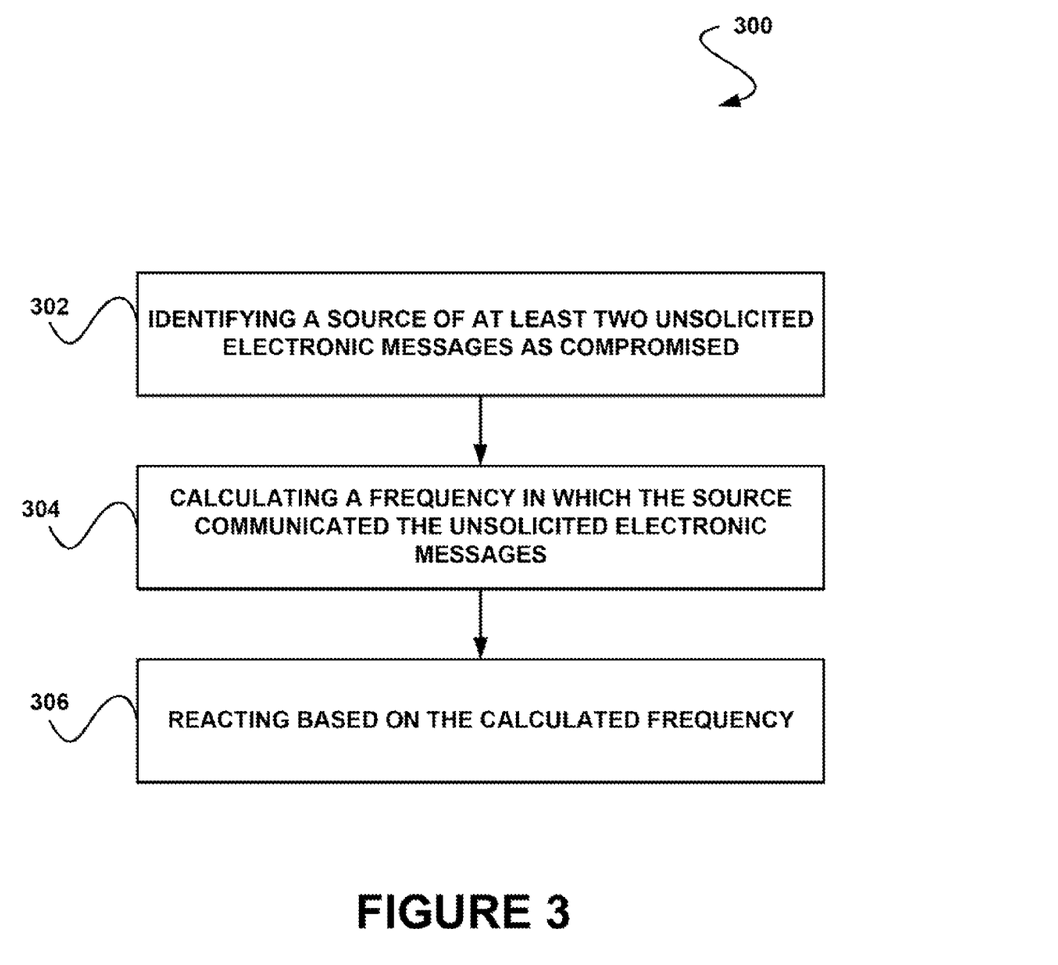
FIG. 3 shows a method for reacting based on a frequency in which a compromised source communicates unsolicited electronic messages, in accordance with one embodiment.

FIG. 3 shows a method 300 for reacting based on a frequency in which a compromised source communicates unsolicited electronic messages, in accordance with one embodiment. As an option, the method 300 may be carried out in the context of the architecture and environment of FIGS. 1 and/or 2. Of course, however, the method 300 may be carried out in any desired environment.

As shown in operation 302, a source of at least two unsolicited electronic messages is identified as compromised. In the context of the present description, the source may be any source capable of sending electronic messages. For example, the source may include a personal computer, a server, a gateway, a personal digital assistant (PDA), a cellular telephone, any of the devices described above with respect to Figures and/or 2, etc.

Additionally, the unsolicited electronic messages may be any electronic messages [e.g. electronic mail (email) messages, short message service (SMS) messages, instant messaging (IM) messages, etc.] that are not solicited (e.g. requested, etc.) by a designated destination of the unsolicited electronic messages. For example, the unsolicited electronic messages may include unwanted mails, advertisement emails, advertisement SMS messages, electronic messages containing malware (e.g. viruses. Trojans, worms, etc.), etc.

In one embodiment, the unsolicited electronic, messages may be identified using one or more traps. Such traps may include any modules capable of identifying electronic messages communicated over a network (e.g. such as any of the networks described above with respect to FIG. 1). Just by way of example, the traps may include security systems capable of monitoring electronic messages communicated over the network, intercepting electronic messages communicated over the network, etc.

Furthermore, in the context of the present description, the compromised source may be any source that unknowingly, involuntarily, etc. sends the unsolicited electronic messages. For example, the compromised source may include a zombie computer, a computer infected with malware, a computer remotely controlled without permission, a computer with compromised security, etc.

Further still, the source of the unsolicited electronic messages may be identified as compromised in any manner. In one embodiment, a speed of a network connection used by the source (e.g. to send the unsolicited electronic message, to browse a network, etc.) may be determined. For example, the speed of the network connection may be determined using an internet protocol (IP) netspeed database. Such netspeed database may indicate network connection speeds utilized by various IP addresses. Thus, the IP address of the compromised source may be utilized to determine the network connection used by such compromised source, via the netspeed database.

In another embodiment, the speed of the network connection used by the source may be compared against a threshold. In yet another embodiment, the source may be identified as compromised if the speed of the network connection used by the source exceeds the threshold. Just by way of example, if the speed of the source indicates the source utilizes a cable network connection or a digital subscriber line (DSL) network connection, the source may be identified as compromised. As a further example, if the speed of the source indicates the source utilizes a dial-up network connection, the source may not be identified as compromised. In still another embodiment, an IP address may be obtained from the source and compared against a list of IP addresses predetermined to be compromised, where a match indicates the source is compromised.

Furthermore, in operation 304, a frequency in which the source communicated the unsolicited electronic messages is calculated. For example, the frequency may be calculated by determining a time difference between receipt of one of the unsolicited electronic messages and receipt of another one of the unsolicited electronic messages. In one embodiment, the time difference may be determined between a first one of the unsolicited electronic messages, and another one of the unsolicited electronic messages that was received subsequent to the first one of the unsolicited electronic message. In another example, the frequency may be calculated by computing an average time difference between receipt of multiple unsolicited electronic messages. Just by way of example, a time between each subsequent pair of messages may be accumulated and may be divided by a number of the message pairs, for determining the average time difference.

Additionally, in operation 306, a reaction is performed based on the calculated frequency. In one embodiment, the reaction may include approximating an amount of unsolicited electronic messages for a predetermined time period that are associated with the source. In another embodiment, the reaction may include alerting an internet service provider (ISP) that hosts the source. In still another embodiment, the reaction may include displaying a name of the source, the ISP for the source, the frequency in which the source communicated the unsolicited electronic messages, an amount of unsolicited electronic messages sent by the source, etc. In yet another embodiment, the reaction may include displaying an image of a world map reflecting information (e.g. a location, etc.) regarding the source. As an option, the world map may be dynamically updated, thereby dynamically depicting the information regarding the source (e.g. the location of the compromised source, etc.) in almost real time. In still yet another embodiment, the reaction may include blocking electronic messages received from the source.

More illustrative information will now be set forth regarding various optional architectures and features with which the foregoing technique may or may not be implemented, per the desires of the user, it should be strongly noted that the following information is set forth for illustrative purposes and should not be construed as limiting in any manner. Any of the following features may be optionally incorporated with or without the exclusion of other features described.

Figure 4:
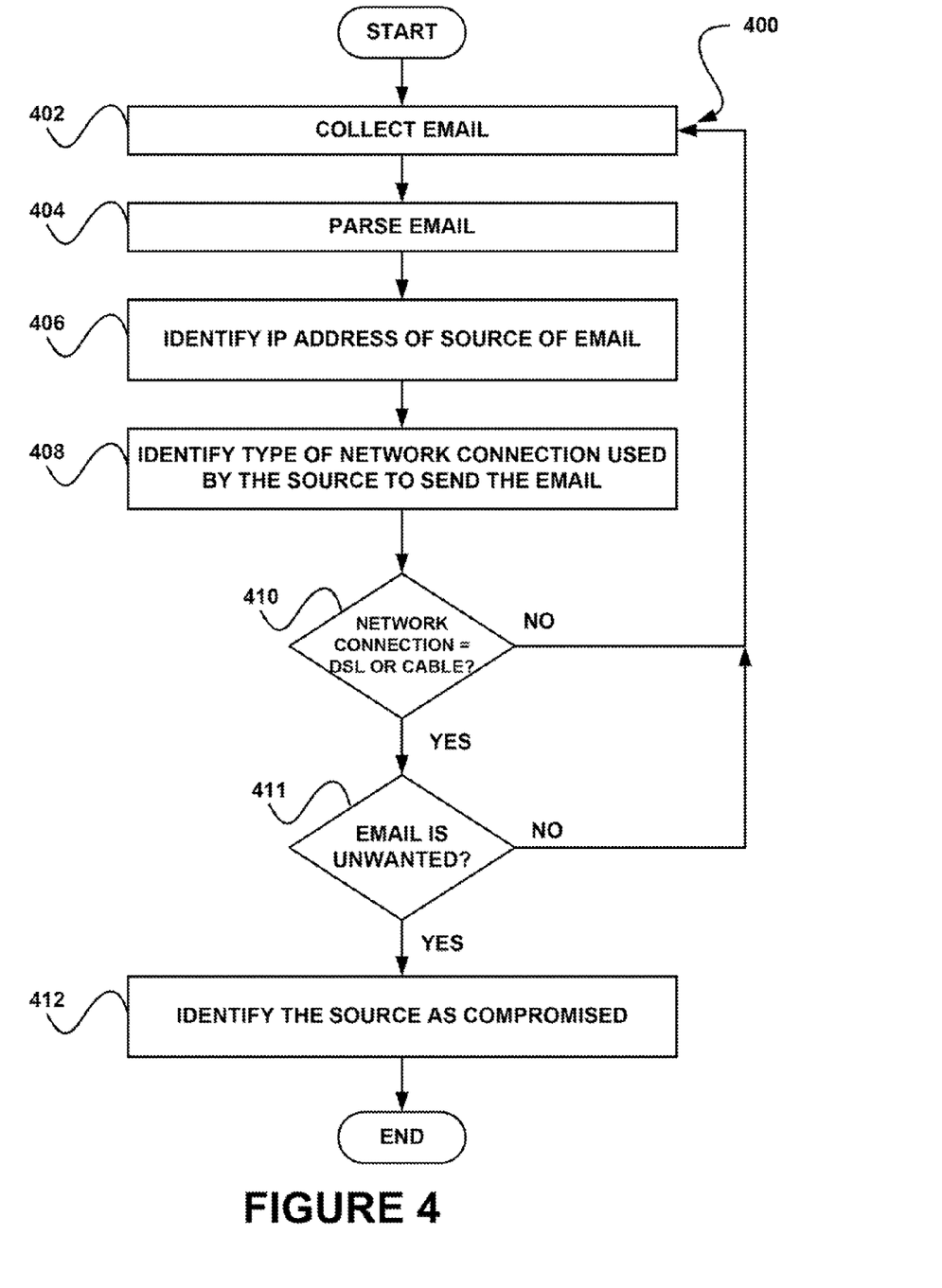
FIG. 4 shows a method for identifying a source as compromised, in accordance with another embodiment.

FIG. 4 shows a method 400 for identifying a source as compromised, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, an email is collected. In one embodiment, the email may be collected by receiving the email from a source (e.g. a sender, etc.) at a destination designated by the email, a security system, etc. In another embodiment, the email may be collected by retrieving the email from a database. In still another embodiment, the email may be collected by retrieving the email from an email trap (e.g. honeypot, etc.). Of course, however, the email may be collected in any manner.

Additionally, the email is parsed. See operation 404. The email may be parsed in any manner. For example, the email may be parsed for identifying information included in the email. Further, in operation 406, an IP address of the source of the email is identified. In one embodiment, the IP address may be identified by analyzing the parsed email. In another embodiment, the IP address may be identified by extracting the IP address from the email. Just by way of example, the email may be parsed in order to obtain the IP address of the source of the email from a header field of the email (e.g. "Received:" header field of the email, etc.), in one embodiment.

Furthermore, in operation 408, a type of network connection used by the source to send the email is identified. In one embodiment, the type of network connection may be identified by checking the IP address of the source of the email against a database. For example, the IP address of the source of the email may be compared against a database containing the type of network connection utilized by various IP address ranges. In another example, the database may map the IP address of the source of the email to the net speed used by the source to send and/or receive data over a network. Such net speed may thus indicate the type of network connection e.g. cable. DSL, dial-up, etc. used by the source.

Additionally, in decision 410, it is determined whether the type of the network connection is a DSL connection or a cable connection. If it is determined in decision 410 that the type of the network connection is a DSL connection or a cable connection, the method 400 proceeds, since such network connection types are more likely to be compromised. In other words, sources with just a dial-up connection may be less likely to serve as an effective zombie, etc.

If it is determined in decision 410 that the type of the network connection is a DSL connection or a cable connection, it is further determined whether the email is unwanted. Note decision 411. In one embodiment, the email may be determined to be unwanted based on a comparison of any portion of the email (e.g. a body of the email, a subject of the email, a header of the email, etc.) with data (e.g. text, images, etc.) predetermined to indicate an unwanted status. Thus, if any portion of the email matches the predetermined data, the email may be determined, to be unwanted. Of course, it should be noted that the email may be determined to be unwanted in any desired manner.

If it is determined that the email is unwanted, the source of the email is identified as compromised. Note operation 412. In one embodiment, the source of the email may be flagged as being, compromised. In another embodiment, the IP address of the source of the email may be added to a database of IP addresses of compromised sources. Of course, however, the source of the email may be identified as compromised in any manner.

If it is determined in decision 410 that the type of the network connection is not a DSL connection or a cable connection, net email is collected (operation 402). In addition, if it is determined is decision 411 that the email is not unwanted, the next email is collected (operation 402). In this way, sources of emails may be identified as compromised.

Figure 5:
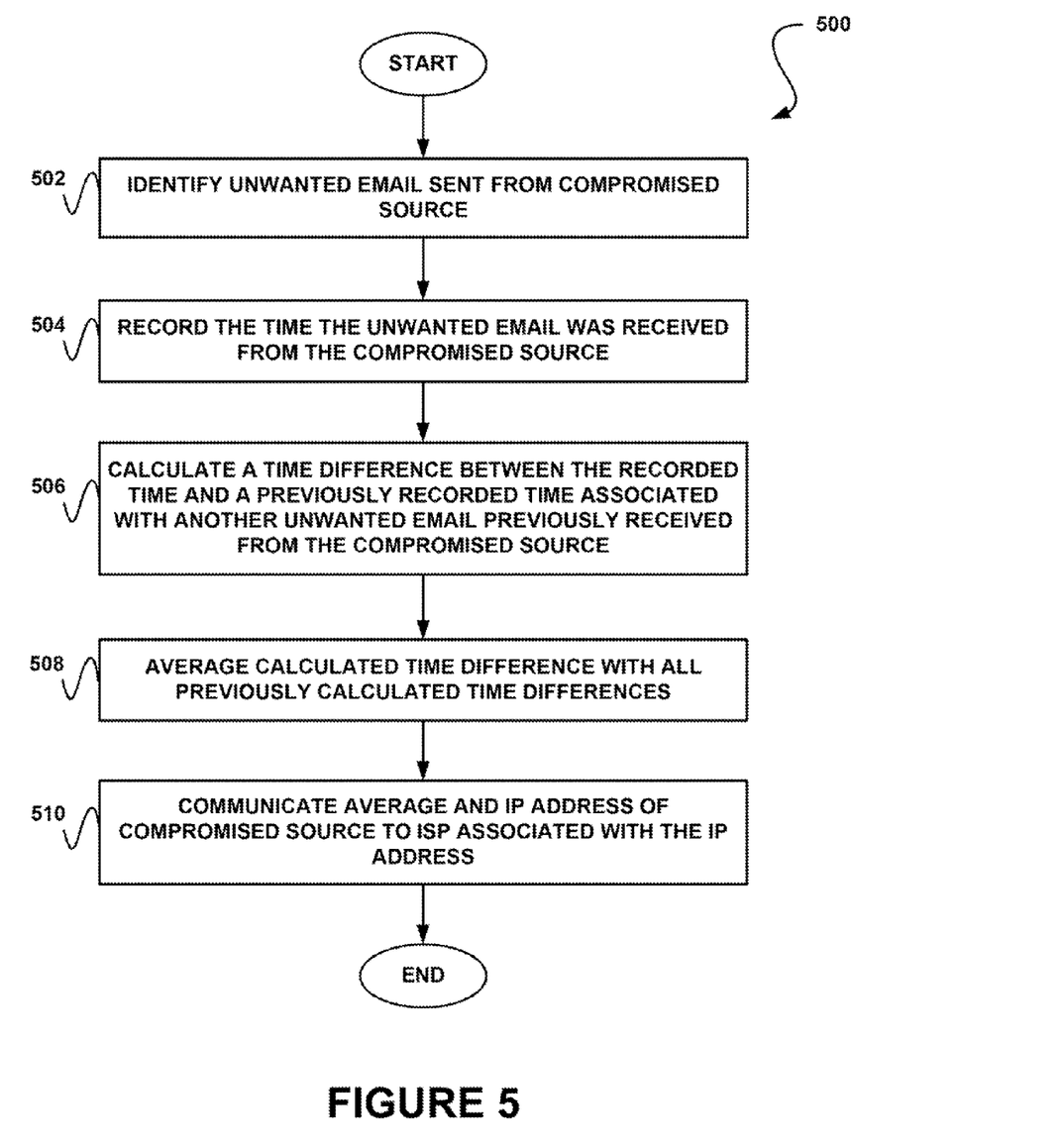
FIG. 5 shows a method for calculating an average time difference between unsolicited electronic messages, in accordance with yet another embodiment.

FIG. 5 shows a method 500 for calculating an average time difference between received unsolicited electronic messages, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown operation 502, an unwanted email sent from a compromised source is identified. In one embodiment, the email may be received from a source with an IP address that matches the IP address of a known compromised source. In another embodiment, the source of an email may be identified as compromised as described above in operation 412 of FIG. 4. Additionally, the email may be identified by being received by an email trap, a destination device designated by the email, etc.

Further, as shown in operation 504, a time that the email was received (e.g. by the destination, etc.) from the compromised source is recorded. For example, the email may be time-stamped with the time the email was received. In another example, the time the email was received may be stored in a database.

Additionally, as shown in operation 506, a time difference between the recorded time and a previously recorded time associated with another unwanted email previously received from the compromised source may be calculated. For example, the email may be received immediately subsequent to the previously received unwanted email. In this way, the time difference may include a time period between unwanted emails subsequently received from the compromised source. In one embodiment, the time difference may be calculated by determining a difference between stored time values in a database. In another embodiment, the time difference may be calculated by determining the difference between the timestamp of the unwanted email and the timestamp of the previously received unwanted email.

Further, the calculated time difference is averaged with all previously calculated time differences. See operation 508. In one embodiment, the previously calculated time differences may be retrieved from a database and averaged with the calculated time difference. In another embodiment, a single average value may be stored for each compromised source and may be updated every time an unwanted email sent from that source is identified. In yet another embodiment, the calculated time difference may be averaged for the compromised source by dividing the total time difference for the compromised source by the number of differences. For example, the calculated time difference may be added to a total time difference representing a total time between subsequent pairs of the unwanted emails received from the compromised source. Such total time difference may then be divided by the number of subsequent pairs of unwanted emails received, for determining the average time between which emails are received from the compromised source.

Additionally, in operation 510 the average calculated time difference and the IP address of the compromised source are communicated to an ISP associated with the IP address. In one embodiment, the ISP may host the compromised source. In another embodiment, the average calculated time difference and the IP address of the compromised source may be displayed on a web page, and the ISP may be provided with a link to the web page. In yet another embodiment, the average calculated time difference and the IP address of the compromised source may be sent in an email to the ISP. Of course, the average calculated time difference and the IP address of the compromised source may be communicated to the ISP in any manner.

Figure 6:
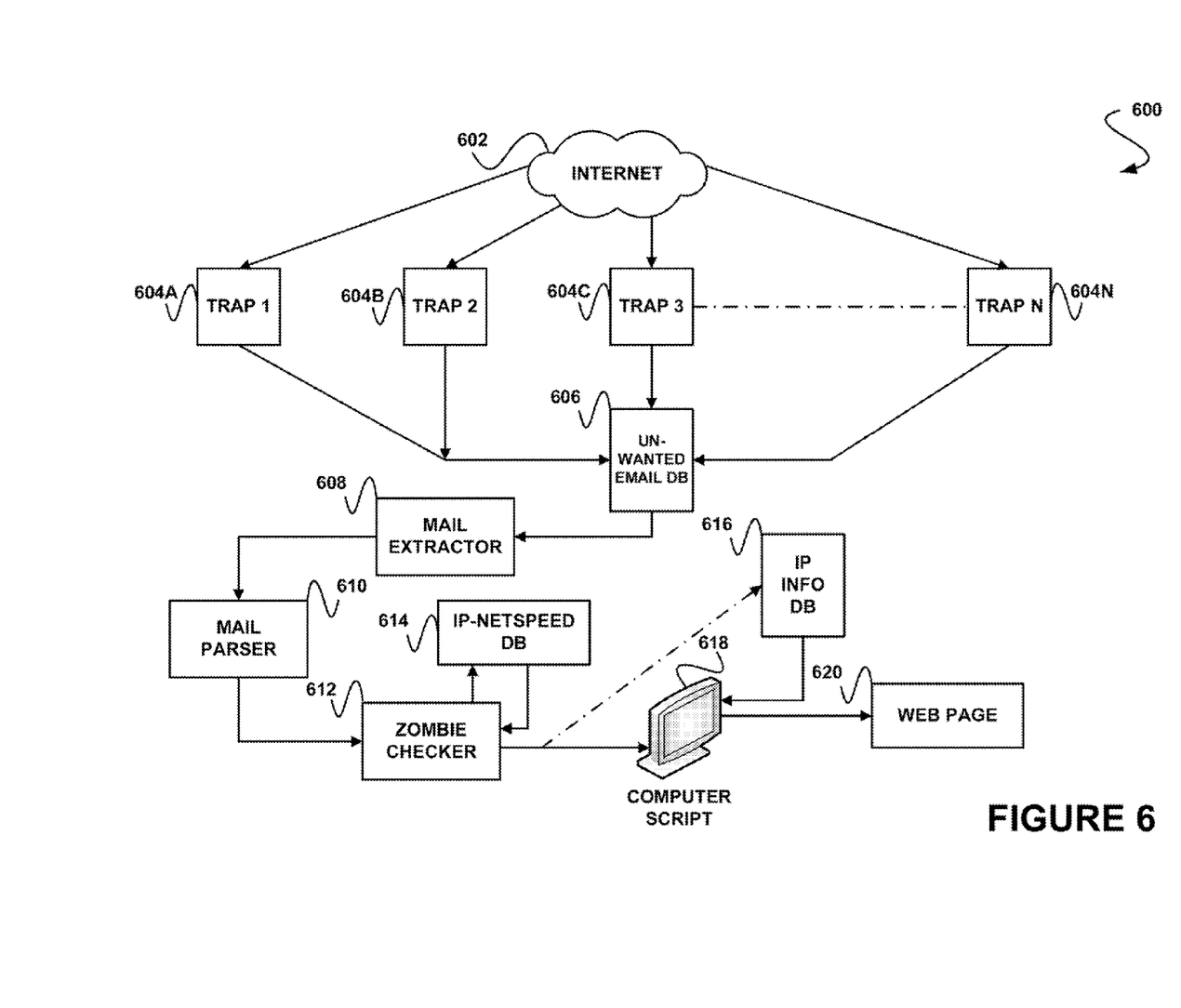
FIG. 6 shows a system for reacting based on a frequency in which a compromised source communicates unsolicited electronic messages, in accordance with still yet another embodiment.

FIG. 6 shows a system 600 for calculating a frequency in which a source communicates unsolicited electronic messages, in accordance with still yet another embodiment. As an option, the system 600 may be implemented in the context of the architecture and environment of FIGS. 1-5. Of course, however, the system 600 may be implemented in any desired environment. Again, it should be noted that the aforementioned definitions may apply during the present description.

As shown, multiple traps 604A-4N are in communication with the internet 602. In the context of the present embodiment, the traps 604A-N may include any modules capable of receiving emails via the internet 602. In one embodiment, the traps 604A-N may be agents, applications, etc. implemented at various sites that are dedicated to receiving email, including unwanted email, via the internet 602. For example, the traps 604A-N may include one or more honeypots. In another embodiment, the traps 604A-N may report and/or store one or more types of received emails. For example, the traps 604A-N may report any received potentially unwanted emails. In another example, the traps 604A-N may store any received potentially unwanted emails in a database.

In yet another embodiment, the traps 604A-N may include one or more email accounts. In another embodiment, one or more of the traps 604A-N may subscribe to newsletters, email lists, or other subscriptions. For example, the traps 604A-N may subscribe to one or more newsletters that are used by unwanted email sources to develop email lists. In this way, the traps 604A-N may be included, in one or more email lists. In still yet another embodiment, the traps 604A-N may optionally timestamp the received emails for indicating a time the emails were each received.

Additionally, the traps 604A-N are in communication with an unwanted email database 606. In one embodiment, the traps 604A-N may send one or more received potentially unwanted emails to the unwanted email database 606. The unwanted email database 606 may be any database capable of storing one or more potentially unwanted emails or portions thereof. As an option, the database 606 may include any of the disk storage units 220 illustrated in FIG. 2. As an option, the traps 604A-N may determine whether the emails received are at least potentially unwanted (e.g. by scanning the received emails, etc.). In this way, only emails determined to at least be potentially unwanted may be sent to the unwanted email database 606.

Further, a mail extractor 608 is in communication with the unwanted email database 606. In one embodiment, the mail extractor 608 may periodically retrieve potentially unwanted emails from the unwanted email database 606. For example, the mail extractor 608 may search the unwanted mail database 606 on a predetermined basis in order to determine if one or more new potentially unwanted emails have been stored in the unwanted email database 606 since the last communication between the mail extractor 608 and the unwanted email database 606. If any new potentially unwanted emails are detected, the mail extractor 608 may retrieve such emails. In this way, a number of potentially unwanted emails stored in the unwanted email database 606 may be limited.

Further still, the mail extractor 608 is in communication with a mail parser 610. In one embodiment, the mail extractor 608 may forward any potentially unwanted emails retrieved from the unwanted email database 606 to the mail parser 610, in another embodiment, the mail parser 610 may identify one or more aspects of received potentially unwanted emails by parsing such received potentially unwanted emails. Thus, the mail parser 610 may include any module capable of parsing a received email.

For example, the mail parser 610 may identify the IP address of a source of each of the received potentially unwanted emails. As an option, the mail parser 610 may identify the type of connection used by the sources of the potentially unwanted emails. In addition, the mail parser 610 is in communication with a zombie checker 612. In one embodiment, the mail parser 610 may send information regarding one or more potentially unwanted emails to the zombie checker 612. For example, the mail parser 610 may send the IP address of sources of potentially unwanted emails to the zombie checker 612. The mail parser 610 may also send a timestamp associated with each of such potentially unwanted emails to the zombie checker 612.

The zombie checker 612 may be any device capable of determining whether a source of a potentially unwanted email is compromised. In one embodiment, the zombie checker 612 may determine the type of network connection, the speed of the network connection, etc. being used by the source of the potentially unwanted emails. In another embodiment, the zombie checker 612 may determine whether the source of the potentially unwanted emails is compromised based on such types of network connection, etc. In still another embodiment, the zombie checker 612 may verify that the potentially unwanted email received by the mail parser 610 is in fact unwanted. For example, the zombie checker 612 may analyze the text of the potentially unwanted email. In yet another embodiment, the zombie checker 612 may timestamp emails confirmed to be unwanted.

Furthermore, the zombie checker 612 is in communication with an IP netspeed database 614. In one embodiment, the IP netspeed database 614 may contain information regarding the communication speed of one or more email sources. In another embodiment, this information may be organized by the IP address of the email source. For example, the IP netspeed database 614 may contain information regarding the communication speed of one or more ranges of IP addresses. In still another embodiment, the IP netspeed database 614 may contain information regarding one or more IP address ranges provided by various ISPs.

In still another embodiment, the zombie checker 612 may check the IP addresses of one or more sources of unwanted emails against the IP netspeed database 614 in order to determine the communication speed of the sources. In this way, the zombie checker 612 may determine whether the one or more sources of unwanted emails are compromised sources.

Additionally, the zombie checker 612 is in communication with an IP information database 616. In one embodiment, the zombie checker 612 may send information regarding one or more compromised sources to the IP information database 616. For example, the zombie checker 612 may send the IP address and timestamp of the compromised sources of unwanted emails to the information database 616. In another example, the zombie checker 612 may send the confirmed unwanted email to the IP information database 616.

The IP information database 616 may be any type of database capable of storing data regarding unwanted emails and/or compromised sources. For example, the IP information database 616 may store the timestamp of one or more unwanted emails and the IP address of the compromised source of the unwanted email. In another embodiment, the IP information database 616 may be utilized to calculate the average life of a compromised source of the unwanted emails. The average life may include the average time between which the compromised source sends subsequent unwanted emails. Thus, the IP information database 616 may determine the average time taken between the sending of subsequent unwanted emails by the compromised source.

In yet another embodiment, the IP information database 616 may provide information on the ISP that hosts one or more compromised sources of unwanted emails. In still another embodiment, the IP information database 616 may provide raw data regarding stored compromised sources and unwanted emails for reporting. For example, raw data may be organized and ranked for online presentation. In this way, compromised sources of unwanted emails may be analyzed and tracked.

Further, the zombie checker 612 and the IP information database 616 are in communication with a computer script 618. In one embodiment, the zombie checker 612 may send information regarding one or more unwanted emails and/or compromised sources to the computer script 618. For example, the zombie checker 612 may send the IP address of compromised sources of unwanted emails to the computer script 618.

In another embodiment, the IP information database 616 may provide statistical information regarding one or more compromised sources to the computer script 618. For example, the IP information database 616 may provide the average life of a compromised source of unwanted emails to the computer script 618. As another operation, the computer script 618 may calculate the average life of such compromised source based on information received from the IP information database 616. In another example, the IP information database 616 may provide information regarding the ISPs that host compromised sources of unwanted emails.

Further still, the computer script 618 is in communication with a web page 620. In one embodiment, the computer script 618 may display on the web page 620 information regarding one or more compromised sources of unwanted emails. For example, the computer script 618 may display on the web page 620 a top number of ISPs that host compromised sources of unwanted emails, all ISPs that host compromised sources of unwanted emails, the IP address of compromised sources of confirmed unwanted emails, etc.

In another embodiment, the computer script 618 may organize the data displayed on the web page 620 by date, time, number of confirmed unwanted emails sent, etc. In still another embodiment, the computer script 618 may notify one or more ISPs regarding compromised sources that the ISP hosts. For example, the computer script 618 may notify one or more ISPs that they are hosting a compromised source of unwanted emails. In another example, the computer script 618 may provide the ISP with information such as the IP address of the compromised source, the text of the of unwanted emails, etc.

In still another embodiment, the computer script 618 may display an image of a world map containing information regarding compromised sources on the web page 620. For example, the web page 620 may display a world map that includes markings in various locations designating the amount of compromised sources in such locations. In another example, the markings may be sized in proportion to the threat posed by the compromised source. In another embodiment, the web page 620 may display dynamic data about the location of the most compromised sources from all around the world. An indication of the location may be displayed as a small circular Object (e.g. a dot), and such small circular object may further appear dynamically on the web page 620 in response to identifying a compromised source at a particular point in time. In another embodiment, the web page 620 may be customizable. For example, the web page 620 may be set up by a user to refresh every hour, half hour, ten minutes, etc.

In this way, the number of confirmed unwanted emails sent by compromised sources may be identified, and the ISPs hosting the compromised sources may be notified. The ISPs may then take suitable action or alert the owners of the compromised sources for preventing additional communication of unwanted email.

Figure 7:
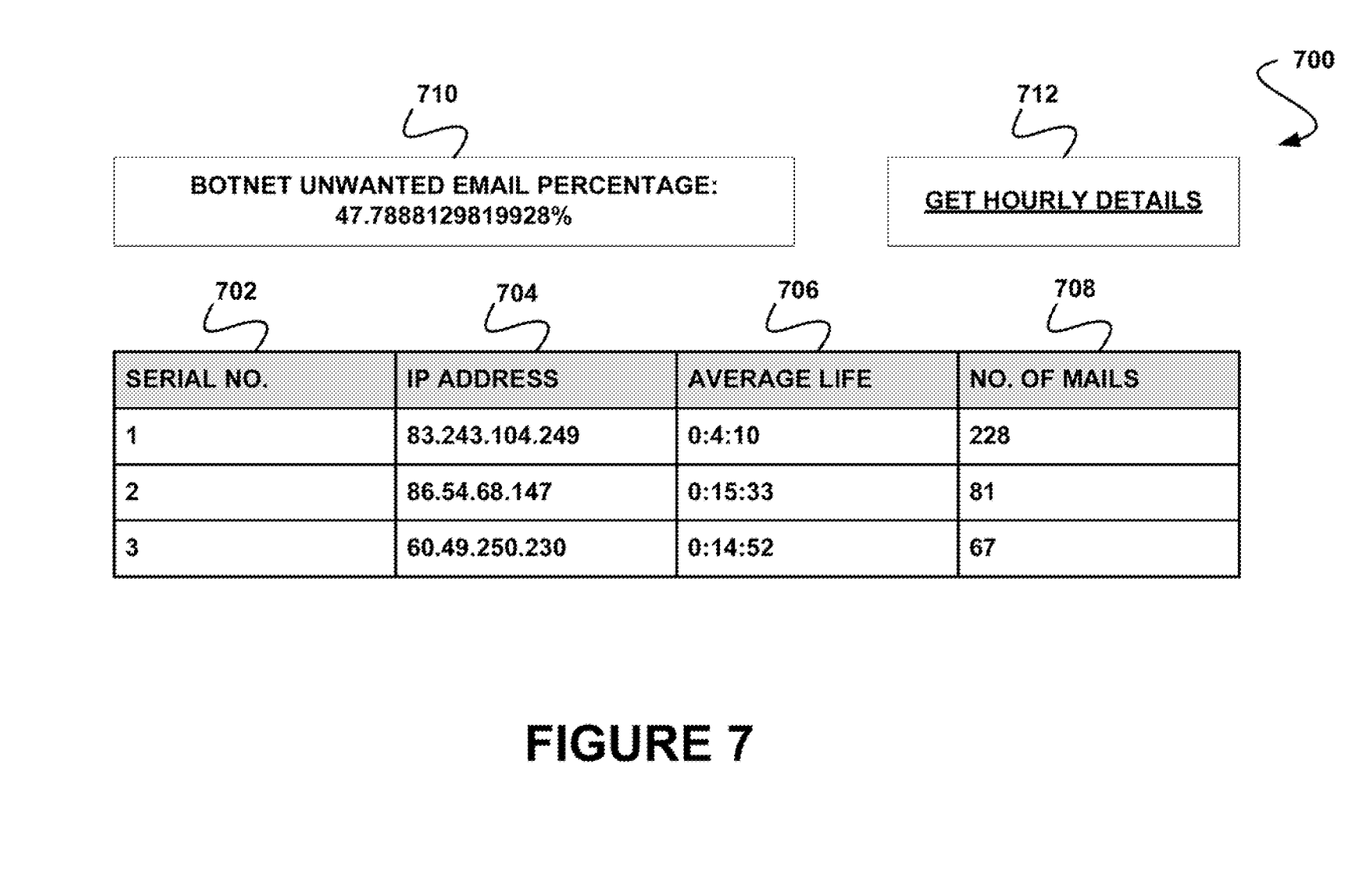
FIG. 7 shows a sample output of a frequency in which a compromised source communicates unsolicited electronic messages, in accordance with still yet another embodiment.

FIG. 7 shows a sample output 700 of a frequency in which a compromised source communicates unsolicited electronic messages, in accordance with still yet another embodiment. As an option, the sample output 700 may be implemented in the context of the architecture and environment of FIGS. 1-6. For example, the sample output 700 may be implemented with respect to the web page 620 of FIG. 6. Of course, however, the sample output 700 may be implemented in any desired environment. Yet again, it should be noted that the aforementioned definitions may apply during the present description.

As shown, a serial number field 702 displays each compromised source of confirmed unwanted emails. In one embodiment, the compromised sources may be organized in the serial number field 702 according to the number of unwanted emails sent. For example, a compromised source that sent the greatest number of unwanted emails may be listed first in the serial number field 702. In another embodiment, the compromised sources may be organized in the serial number field 702 according to the average life of the compromised source. Optionally, the value in the serial number field 702 for each compromised source may be unique to the compromised source.

In addition, an IP address field 704 displays an IP address for each compromised source that is displayed. In one embodiment, the IP address displayed in the IP address field 704 may be obtained from one or more unwanted emails sent by the compromised source having the IP address.

Furthermore, an average life field 706 displays the average life of the compromised source, in one embodiment, the average life may include the frequency in which the compromised source sends confirmed unwanted emails. For example, the average life may include the average time taken between the sending of subsequent unwanted emails by the compromised source.

Additionally, an email number field 708 displays a total number of unwanted emails that have been sent by the compromised source over a predetermined, amount of time. For example, the email number field 708 may display the number of unwanted emails sent by the compromised source in the last week, day, hour, etc.

Further, a botnet unwanted email percentage field 710 displays a percentage of unwanted emails that have originated from the compromised sources. For example, if half of all received unwanted emails is determined to originate from the compromised sources, then the botnet unwanted email percentage field 710 may display a percentage of 50%. Further still, the hourly details link 712 links to an hourly display of fields 702-710. In one embodiment, selecting the hourly details link 712 may update the fields 702-708 on an hourly basis.

While various embodiments have been described above, it should be understood that they have been presented by way of example only, and not limitation. Thus, the breadth and scope of a preferred embodiment should not be limited by any of the above-described exemplary embodiments, but: should be defined only in accordance with the following claims and their equivalents.

What is claimed is:

1. A method, comprising: identifying a source of at least two unsolicited electronic messages as compromised, wherein the source is identified as compromised based, at least, on a speed of a network connection associated with an Internet protocol (IP) address of the source, which communicated the at least two unsolicited electronic messages; determining whether the network connection being used by the source is associated with a cable network connection, a digital subscriber line (DSL) network connection, or a dial-up network connection; wherein a source is not identified as being compromised if the network connection is associated with a dial-up network connection; calculating a frequency in which the source communicated the unsolicited electronic messages; and reacting based on the calculated frequency, wherein the reacting includes displaying an image of a world map reflecting a location associated with the source.

2. The method as set forth in claim 1, wherein the source includes a zombie computer.

3. The method as set forth in claim 1, wherein the identifying includes determining a speed of a network connection used by the source.

4. The method as set forth in claim 1, wherein the identifying includes comparing a speed of a network connection used by the source against a threshold.

5. The method as set forth in claim 4, wherein the source is identified as compromised if the speed of the network connection exceeds the threshold.

6. The method as set forth in claim 1, wherein the reacting includes alerting an internet service provider (ISP) that hosts the source.

7. The method as set forth in claim 1, wherein the reacting includes displaying an amount of unsolicited electronic messages sent by the source.

8. The method as set forth in claim 1, wherein the reacting includes displaying a name of the source.

9. The method as set forth in claim 1, wherein the reacting includes displaying an internet service provider (ISP) for the source.

10. The method as set forth in claim 1, wherein the reacting includes displaying the frequency in which the source communicated the unsolicited electronic messages.

11. The method as set forth in claim 1, wherein the world map includes markings designating an amount of compromised sources at particular locations.

12. The method as set forth in claim 1, further comprising retrieving the unsolicited electronic messages using one or more traps.

13. The method as set forth in claim 1, further comprising storing the unsolicited electronic messages in a database.

14. The method as set forth in claim 13, further comprising forwarding the unsolicited electronic messages from the database to a mail parser.

15. The method as set forth in claim 14, further comprising parsing the unsolicited electronic messages utilizing the mail parser.

16. The method as set forth in claim 1, wherein calculating the frequency includes determining a time difference between receipt of one of the unsolicited electronic messages and receipt of a subsequent one of the unsolicited electronic messages.

17. The method as set forth in claim 1, further comprising recording a time that the unsolicited electronic messages are received.

18. A computer program product embodied on a tangible non-transitory computer readable medium, comprising: computer code for identifying a source of at least two unsolicited electronic messages as compromised, wherein the source is identified as compromised based, at least, on a speed of a network connection associated with an Internet protocol (IP) address of the source, which communicated the at least two unsolicited electronic messages; determining whether the network connection being used by the source is associated with a cable network connection, a digital subscriber line (DSL) network connection, or a dial-up network connection; wherein a source is not identified as being compromised if the network connection is associated with a dial-up network connection; computer code for calculating a frequency in which the source communicated the unsolicited electronic messages; and computer code for reacting based on the calculated frequency, wherein the reacting includes displaying an image of a world map reflecting a location associated with the source.

19. A system, comprising: a processor coupled to a memory and operable to cooperate such that the system can exchange information in a network, the system being configured for: identifying a source of at least two unsolicited electronic messages as compromised, wherein the source is identified as compromised based, at least, on a speed of a network connection associated with an Internet protocol (IP) address of the source, which communicated the at least two unsolicited electronic messages; determining whether the network connection being used by the source is associated with a cable network connection, a digital subscriber line (DSL) network connection, or a dial-up network connection; wherein a source is not identified as being compromised if the network connection is associated with a dial-up network connection; calculating a frequency in which the source communicated the unsolicited electronic messages, and reacting based on the calculated frequency, wherein the reacting includes displaying an image of a world map reflecting a location associated with the source.

20. The system as set forth in claim 19, wherein the memory is coupled to the processor via a bus.

21. The method as set forth in claim 3, wherein the speed of the network connection is determined using an internet protocol (IP) netspeed database.

* * * * *